United States Patent [19]
Okamoto et al.

[11] Patent Number: 5,165,004
[45] Date of Patent: Nov. 17, 1992

[54] WAVELENGTH CONVERSION ELEMENT

[75] Inventors: Sota Okamoto; Kiyofumi Chikuma, both of Saitama, Japan

[73] Assignee: Pioneer Electronic Corporation, Tokyo, Japan

[21] Appl. No.: 756,324

[22] Filed: Sep. 6, 1991

[30] Foreign Application Priority Data

Dec. 17, 1990 [JP] Japan .................................. 2-402606

[51] Int. Cl.$^5$ .............................................. G02F 1/35
[52] U.S. Cl. .................................... 385/122; 359/332; 385/132
[58] Field of Search ........................ 385/122, 129–132; 359/326–332

[56] References Cited

U.S. PATENT DOCUMENTS

| | | | |
|---|---|---|---|
| 4,820,011 | 4/1989 | Umegaki et al. | 385/122 X |
| 4,859,876 | 8/1989 | Dirk et al. | 385/122 X |
| 5,045,364 | 9/1991 | Fang | 385/122 X |
| 5,079,321 | 1/1992 | Sperling et al. | 385/122 X |

FOREIGN PATENT DOCUMENTS 1-172936 7/1989 Japan .

Primary Examiner—John D. Lee
Attorney, Agent, or Firm—Kane, Dalsimer, Sullivan, Kurucz, Levy, Eisele and Richard

[57] ABSTRACT

As the wavelength conversion element is built by jointing a first clad member having a groove section filled with organic non-linear optical material and a second clad member, the core diameter can be controlled precisely and the clad diameter can be made larger easily. Also, as electrodes for applying voltage are arranged adjacent to both side areas along the groove section, the crystal orientation and refractive index can easily be controlled. In addition, the groove section is formed so as to leave both side faces of the first clad member, so that degradation of the organic non-linear optical material filled in the core as well as degradation of the coupling efficiency can be prevented.

9 Claims, 5 Drawing Sheets

WAVELENGTH CONVERSION ELEMENT

BACKGROUND OF THE INVENTION

This invention relates to a wavelength conversion element, and more particularly to the wavelength conversion element using non-linear optical material and to methods of manufacturing the wavelength conversion element.

Recently, a fiber state, or a so-called fiber type of wavelength conversion element has been proposed to obtain higher output of SHG (second-harmonic generation). This element has a cylindrical core section with an outside diameter of about 1 to 2 $\mu$m and a clad member attached to the periphery of this core section with an outside diameter of about 1 to 2 mm. As material for the core section, organic non-linear optical material is used, while glass is used for the clad member.

Conventionally, the fiber type of wavelength conversion element as described above has been manufactured by making fused core material infuse into a glass capillary by means of capillary action and then crystallizing the material therein.

However, the fiber type of wavelength conversion element produced by using the glass capillary has various problems as described below.

At first, to optimize a wavelength conversion efficiency, the core diameter must be controlled at an order of sub-micron. However, with respect to manufacturing the wavelength conversion element, as the core diameter and the clad diameter are fabricated by heating and extending the capillary which is larger than the final dimensions of the wavelength conversion element to be manufactured, a control of the core diameter is extremely difficult.

Secondly, the wavelength conversion efficiency is in proportion to the so-called opperative length, and to obtain a high wavelength conversion efficiency, the fiber length must be made as long as possible, and also use of the fiber with a large clad diameter is required to prevent phase disturbance due to reflection of second harmonic at an interface between the clad and the air.

However, the ratio of core diameter to clad diameter is almost defined by the ratio of core diameter to clad diameter before extension by means of heating, and this ratio is about 1:1000, so that it is very difficult to obtain an extremely large diameter clad.

Thirdly, at both end faces of the wavelength conversion element, organic non-linear optical material in the core section is exposed to the air, which results in degradation of the material, and it is necessary to arrange a sealing layer on the end faces of the fiber to avoid this problem.

SUMMARY OF THE INVENTION

This invention was made taking the situation as described above into consideration, and the purpose is to solve the above-described problems and to provide a wavelength conversion element with an improved wavelength conversion efficiency, which allows more precise control of not only a core diameter but also a crystal orientation and a refractive index and also makes it easy to make a clad diameter larger, and to provide a method for manufacturing the wavelength conversion element as described above. Another purpose of this invention is to provide a wavelength conversion element which can prevent degradation of the organic non-linear optical material filled in the core as well as degradation of its coupling efficiency and to provide the manufacturing method.

To solve the aforesaid problems, a wavelength conversion elements according to this invention is formed by jointing a first clad member and a second clad member through a core section, wherein the first clad member and second clad member are made of glass material respectively, the first clad member has a groove section arranged in a junction face, and the core section is made of organic non-linear optical material which is filled in the groove section of the first clad member.

Furthermore, electrodes for applying voltage so as to control the crystal orientation and the refractive index are arranged in the areas on both sides of the groove section. Additionally, the groove section is formed so as to leave both side faces of the clad member in the longitudinal direction of the groove section.

As the wavelength conversion element according to this invention is formed by jointing the first clad member having a groove section filled with organic non-linear optical material and the second clad member, the core diameter can be controlled precisely and the clad diameter can easily be made larger.

Also electrodes for applying voltage are disposed adjacent to both side areas along the groove section, so that the crystal orientation as well as the refractive index can be controlled appropriately.

Also, the groove section is formed so as to leave both side faces of the first clad member in the longitudinal direction of the groove section, so that degradation of the organic non-linear optical material filled in the core and degradation of its coupling efficiency can be prevented.

DESCRIPTION OF THE PREFERRED EMBODIMENTS

Figure 1A:
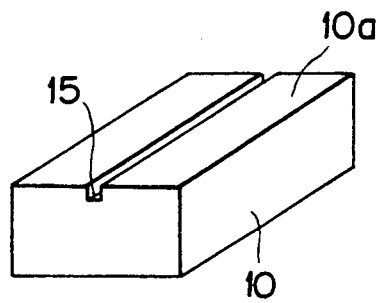
FIGS. 1(A) through 1(C) are perspective views showing a process of assembling the wavelength conversion element as the first embodiment of this invention in time series and a wavelength conversion element after assembly.
Figure 1B:
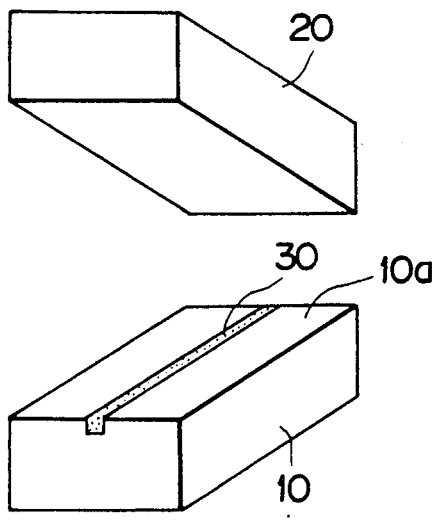
Figure 1C:
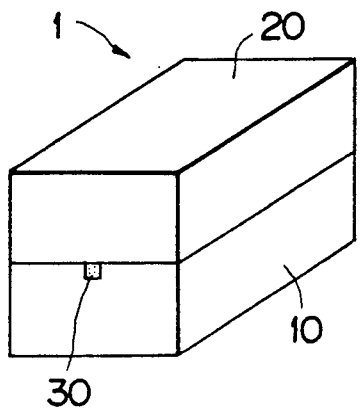

Description is made hereinafter for a first embodiment of the wavelength conversion element according to this invention with reference to FIGS. 1(A) through 1(C). FIGS. 1(A) through 1(C) are perspective views showing a process of assembling the wavelength conversion element according to this invention in time series and a completed wavelength conversion element after assembly.

The wavelength conversion element 1 according to this invention is built by jointing a first clad member 10 and a second clad member 20 through a core section 30.

The clad member 10 is made of glass material having an almost retangular parallelpiped, and a groove section 15 is arranged in a junction face 10a with the second clad member 20.

As the glass material, optical glass products such as SF15, SF1, SF4, LaF02, LaF07 and La08 are available.

The groove section 15 is arranged to form an optical waveguide by filling the core material described hereafter, and, for this reason, generally the groove section 15 is formed at a central portion of the clad member 10 along its longitudinal direction. Preferably, a cross-section of this groove section 15 should have a rectangular form, and the cross-sectional aspect ratio (a ratio of width to height) should be in a range from 0.8 to 1.2. These specifications are required to make the cross-section as circular as possible so that an intensity distribution of generated second harmonic may take a homogeneously ring form. Preferably the groove section as described above should be manufactured by using the photo-lithography method for convenience of precise processing. The photo-lithography method generally comprises (1) a photoresist coating process, (2) an exposure process, (3) a development process, (4) an etching process, and (5) a photoresist removal process.

In the photoresist coating process (1), the photoresist is applied to the junction face of the first clad member 10 in which the groove section is arranged. The photoresist is generally applied with a spinner. The photoresist film coated on the junction face is heated in an oven (this process is called post-baking) immediately after application of the photoresist coating process so as to completely evaporate the solvent therein and improve the adhesion between the photoresist film and the clad member 10.

In the exposure process (2), the photoresist is exposed to ultraviolet ray through a mask to form a groove pattern. Generally masking is made according to the contact method.

In the development process (3), the development is made by either dipping the photoresist into a development solution or spraying the development solution over the photoresist. If the photoresist is of a negative type, parts of photoresist not exposed to ultraviolet ray is fused away, while photoresist in the exposed parts remains. After development, post-baking is performed to improve the etchingproof property.

In the etching process (4), a groove processing is made down to the specified depth by means of the etching.

In the photoresist removal process (5), the photoresist is removed by using appropriate organic solvent.

In the groove section 15 thus formed, a so-called non-linear optical material is filled to form the core section 30.

It is preferable to use organic non-linear optical material with a high wavelength conversion efficiency as the non-linear optical material. The organic non-linear optical material, such as MNA (2-methyl-4-nitroaniline),
DAN (4-(N,N-dimethylamino)-3-acetamidonitrobenzene),
NPP (N-(4-nitrophenyl)-(L)-prolinol),
PNP (2-(N-prolinol)-5-nitropyridine),
DMNP (3,5-dimethyl-1-(4-nitrophenyl)pyrazole),
MMONS (3-methyl-4-methoxy-4'-nitrostilbene),
m-NA (meta-nitroaniline),
MAP (3-methyl-(2,4-dinitrophenyl-aminopropanoate)),
POM (3-methyl-4-nitropyridine-1-oxide, HEX (hexamine) and
BZL (benzyl)
are available.

The organic non-linear optical material as described above is once fused, then filled in the groove section 15, cooled and crystalized therein to form the core section 30.

The junction face 10a of the first clad member 10 with the groove section filled with organic non-linear optical material is covered with the second clad member 20 so that the core section 30 may be sealed up. Generally the second clad member 20 has only to have a rectangular parallelpiped form, and preferably the material should be the same as that of the aforesaid first clad member 10. Note that junction between the first clad member 10 and the second clad member 20 is made, for instance, in an adhesion manner using the optical contact technology, or in an adhesion manner using optical adhesive such as balsam, epoxy resin, metacrylic resin or polyester resin.

Figure 2A:
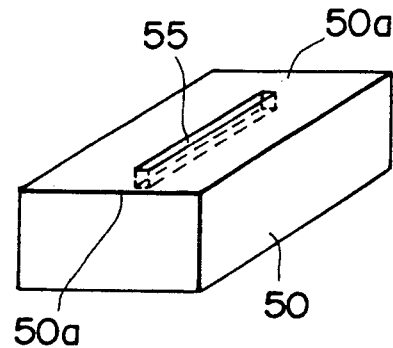
FIGS. 2(A) through 2(C) are perspective views showing a process of assembling the wavelength conversion element as the second embodiment of this invention and a wavelength conversion element after assembly.
Figure 2B:
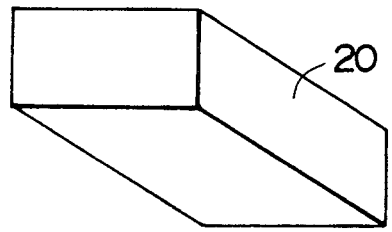
Figure 2B:
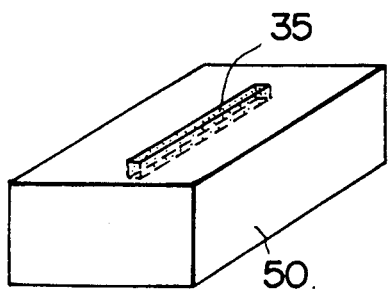
Figure 2C:
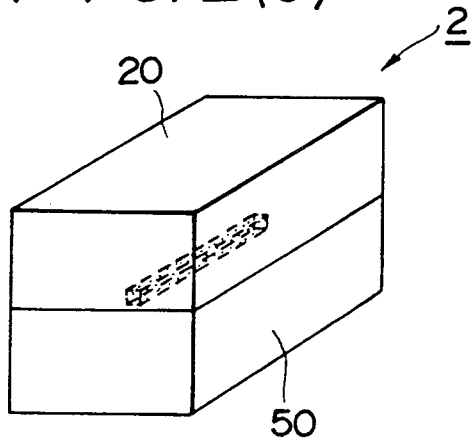

Then description is made below for a second embodiment of the wavelength conversion element according to this invention with reference to FIGS. 2(a) through 2(c).

A wavelength conversion element in the second embodiment is rather different from that in the aforesaid first embodiment in that edge faces of a groove section 55 of a first clad member 50 are not exposed. In other words, the groove section 55 of the first clad member 50 is formed so as to leave both side faces 50a and 50a on both sides of the first clad member 50.

With this configuration, the organic non-linear optical material filled in the groove section 55 is completely sealed up from the external atmosphere, which is effective for preventing the organic non-linear optical material from being degraded.

Figure 3A:
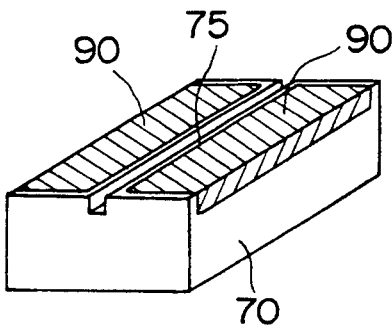
FIGS. 3(A) through 3(C) are perspective views showing a process of assembling the wavelength conversion element as the third embodiment in time series and a wavelength conversion element after assembly.
Figure 3B:
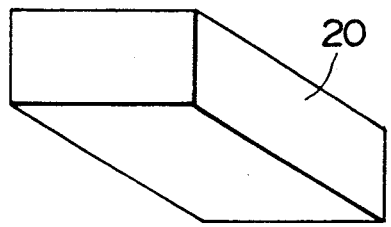
Figure 3B:
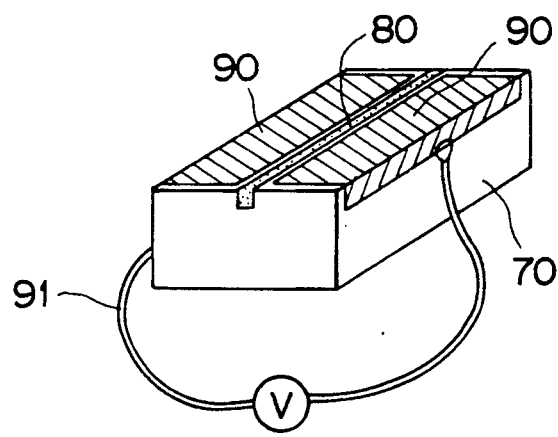
Figure 3C:
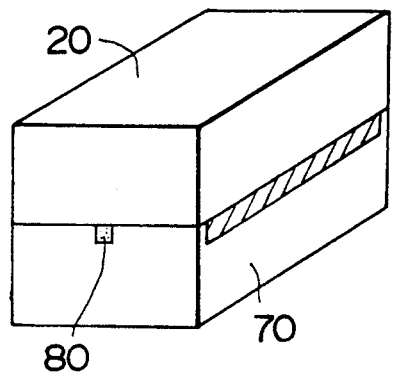

Then, description is made below for a third embodiment of the wavelength conversion element according to this invention with reference to FIGS. 3(a) through 3(c).

Figure 4:
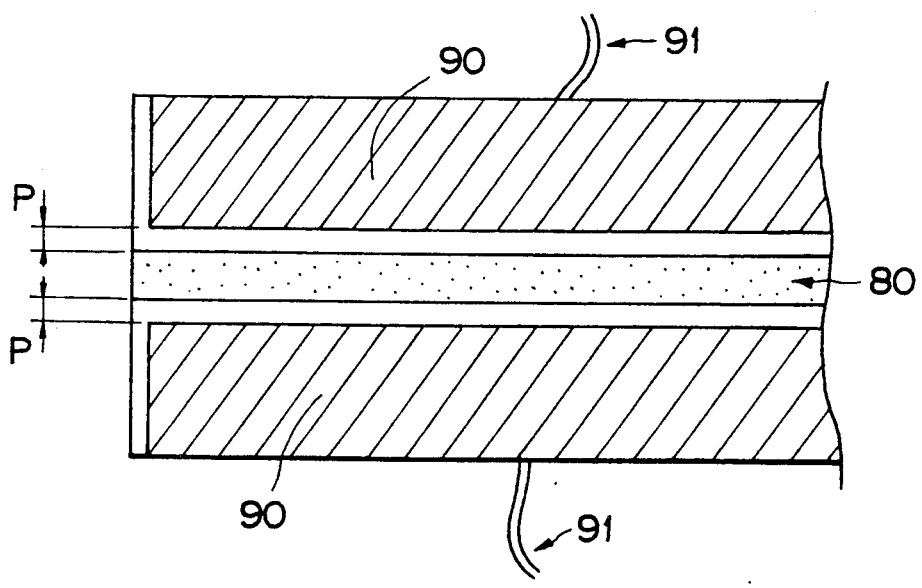
FIG. 4 is a partial flat view of FIG. 3(A)

A wavelength conversion element in the third embodiment is again rather different from those in the first and second embodiment in that electrodes 90 and 90 are arranged in the areas along both sides of the groove section 75 (a core section 80). Voltage is applied to the electrodes 90 and 90, and when the fused organic non-linear material filled in the groove section 75 crystalize, the crystal orientation of the material is controlled by the voltage. Thus, by controlling the crystal orientation, the conversion efficiency can be improved. Furthermore, by applying voltage after crystallization of the organic non-linear optical material, a refractive index of the material can be controlled, which also contributes to improvement of the conversion efficiency. Note that, as shown in FIG. 4, the electrodes 90 and 90 (shown by oblique lines in the drawing) are arranged not contacting the core section 80, but a distance P in a range from 2 to 5 $\mu$m away from it. Also, as shown in FIG. 3(b) and FIG. 4, a pair of lead wires 91 are connected to the electrodes 90, and appropriate voltage is applied thereto. Note that the electrodes 90 and lead wires 91 are made of material such as copper, aluminium, silver, gold, or platinum, in a manner such as the photo-lithography method.

Description is made below for the necessity to control the crystal orientation and refractive index. The fact that it is advantageous, for instance, to make a refractive index $n_2$ of the organic non-linear optical material at second harmonic smaller than a refractive index $n_1$ of the organic non-linear optical material at the fundamental wave so as to obtain larger output of second harmonic was already analyzed and proposed by this applicant (in Japanese Laid-Open Patent Publication No. 2-189205). In addition to it, generally nonlinear optical crystals have anisotropy in their refractive indexes, and the above condition of $n_1 \geqq n_2$ can be achieved by adjusting the crystal orientation and/or by changing the refractive index of the crystal, so that higher output of second harmonic can be obtained.

Figure 5A:
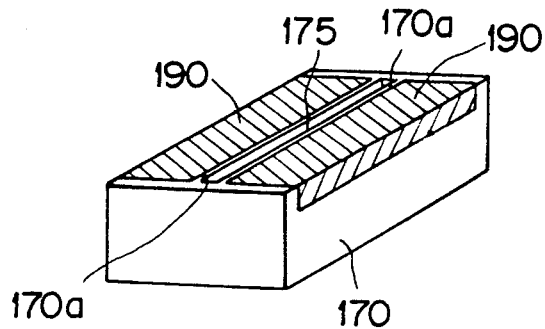
FIGS. 5(A) through 5(C) are perspective views showing a process of assembling the wavelength conversion element as the fourth embodiment of this invention in time series and a wavelength conversion element after assembly.
Figure 5B:
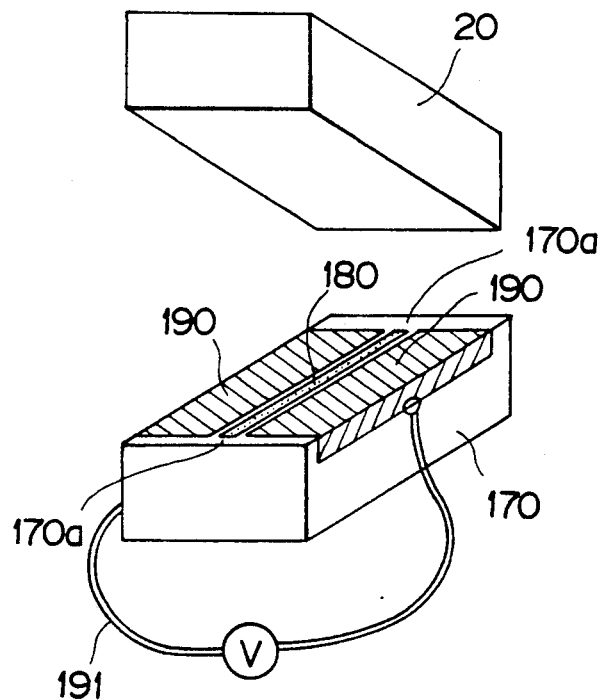
Figure 5C:
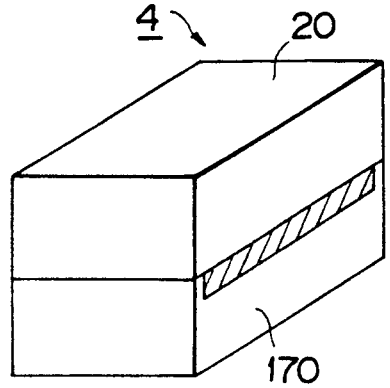

Then, description is made below for a fourth embodiment of the wavelength conversion element according to this invention with reference to FIGS. 5(A) through 5(C). Features of the wavelength conversion element in the fourth embodiment include those of the aforesaid second and third embodiments. In other words, a wavelength conversion element 4 has electrodes 190 and 190 disposed adjacent to both side areas along a groove section 175 to apply voltage for controlling the crystal orientation and refractive index, and at the same time the groove section 175 is formed so as to leave side faces 170a and 170a of the aforesaid first clad member in the longitudinal direction of the groove section 175. With this configuration, not only the crystal orientation and refractive index of the core section can be appropriately controlled, but also degradation of the organic non-linear optical material filled in the core can be prevented.

As the wavelength conversion element is built by jointing a first clad member having a groove section filled with organic non-linear optical material and a second clad member, and core diameter can be controlled precisely, and the clad diameter can be made larger easily. Also electrodes are arranged in the areas along the groove section on both sides thereof to apply voltage, so that the crystal orientation and the refractive index can easily be controlled.

Also, the groove section is formed so as to leave side faces of the aforesaid first clad member in the longitudinal direction of the groove section, so that degradation of the organic non-linear optical material filled in the core as well as degradation of its coupling efficiency can be prevented.

It is to be understood that this invention is not limited to the described embodiments and many othe changes and modifications may be made without departing from the scope of the appended claims.

What is claimed is:

1. A wavelength conversion element formed by jointing a first clad member and a second clad member through a core section,
    said first clad member and said second clad member being made of glass material, respectively,
    said first clad member having a groove section arranged in a junction face and electrodes for applying voltage disposed adjacent to both side areas along the groove section, said groove section having a rectangular cross-section with a ratio of width to height in a range from 0.8 to 1.2, and
    said core section being made of organic non-linear optical material filled in the groove section of the first clad member.

2. A wavelength conversion element according to claim 1, wherein the electrodes for applying voltage are arranged on the junction face apart from the core section and an inside face of the groove section.

3. A wavelength conversion element according to claim 1, wherein said second clad member has an inside surface directly contacting outside surfaces of the electrodes when the second clad member is applied on the first clad member.

4. A wavelength conversion element according to claim 1, wherein the groove section is formed so as to leave both side faces of the first clad member in the longitudinal direction of the groove section.

5. A wavelength conversion element formed by jointing a first clad member and a second clad member through a core section,
    said first clad member and said second clad member being made of a glass material, respectively,
    said first clad member having a groove section in a junction surface, said groove having a rectangular cross-section with a ratio of width to height in a range from 0.8 to 1.2, and
    said core section filling the groove in said first clad member and being made of organic non-linear optical material.

6. A wavelength conversion element in accordance with claim 5, wherein the groove section extends in a longitudinal direction of the first clad member short of both side faces of the first clad member.

7. A wavelength conversion element according to claim 5, wherein the groove section is formed so as to leave both side faces of the first clad member in the longitudinal direction of the groove section.

8. A method of manufacturing a wavelength conversion element formed by jointing a first clad member and a second clad member through a core section, said method comprising the steps of:
    arranging a groove section having a rectangular cross-section with a ratio of width to height in a range from 0.8 to 1.2 in a junction face of the first clad member;
    forming electrodes, for controlling a crystal orientation as well as refractive index, adjacent to both side areas along the groove section;
    filling the groove section with a fused organic non-linear optical material so as to form the core section;
    cooling the organic nonlinear optical material;
    applying a voltage to the electrodes for controlling crystal orientation of the organic non-linear optical material; and
    jointing the first clad member and the second clad member so as to seal up the core section.

9. A method according to claim 8, wherein said groove section is arranged so as to leave both side faces of the first clad member in the longitudinal direction of the groove section.

* * * * *